US010969658B1

(12) United States Patent
Ostrem (10) Patent No.: US 10,969,658 B1
(45) Date of Patent: Apr. 6, 2021

(54) FLEXIBLE ILLUMINATION AND REFLECTOR METHOD AND APPARATUS

(71) Applicant: Daniel L. Ostrem, Saint Paul, MN (US)

(72) Inventor: Daniel L. Ostrem, Saint Paul, MN (US)

(\*) Notice: Subject to any disclaimer, the term of this patent is extended or adjusted under 35 U.S.C. 154(b) by 0 days.

(21) Appl. No.: 16/694,108

(22) Filed: Nov. 25, 2019

(51) Int. Cl.
| | |
|---|---|
| *G03B 15/06* | (2006.01) |
| *F21K 9/90* | (2016.01) |
| *F21V 7/00* | (2006.01) |
| *F21V 7/18* | (2006.01) |
| *F21V 23/04* | (2006.01) |
| *F21V 23/02* | (2006.01) |
| *F21V 7/04* | (2006.01) |
| *F21V 23/00* | (2015.01) |
| *F21Y 105/12* | (2016.01) |
| *F21Y 115/10* | (2016.01) |

(52) U.S. Cl.
CPC ............... *G03B 15/06* (2013.01); *F21K 9/90* (2013.01); *F21V 7/0075* (2013.01); *F21V 7/04* (2013.01); *F21V 7/18* (2013.01); *F21V 23/003* (2013.01); *F21V 23/02* (2013.01); *F21V 23/0435* (2013.01); *F21Y 2105/12* (2016.08); *F21Y 2115/10* (2016.08)

(58) Field of Classification Search
CPC ......... G03B 15/06; F21K 9/90; F21V 7/0075; F21V 7/04; F21V 7/18; F21V 23/003; F21V 23/02; F21V 23/0435; F21V 7/05; F21V 7/24; F21V 7/00; F21Y 2105/12; F21Y 2115/10; F21L 4/00; F21L 4/02; F21L 4/027
See application file for complete search history.

(56) References Cited

U.S. PATENT DOCUMENTS

| | | | | |
|---|---|---|---|---|
| 1,935,045 | A * | 11/1933 | Doane ..................... | F21K 5/023 362/18 |
| 2013/0322051 | A1* | 12/2013 | Ortiz-Gavin ........... | G03B 15/06 362/11 |
| 2018/0224070 | A1* | 8/2018 | Hudson .................. | G03B 15/05 |

(Continued)

OTHER PUBLICATIONS

"2835 White High-CRI LED Strip Light," amazon.com. Retrieved from the Internet: <URL: https://www.superbrightleds.com/moreinfo/flexible-led-strip-lights/2835-white-high-cri-led-strip-light-bright-quad-row-led-tape-light-custom-length-24v-ip20-1317-lmft/3616/7825/?utm_source=product_review_email&utm_medium=email&utm_campaign=product_review_email#writeReview>, 3 pgs. Retrieved on Nov. 18, 2019.

(Continued)

*Primary Examiner* — Bao Q Truong
(74) *Attorney, Agent, or Firm* — Merchant & Gould P.C.

(57) ABSTRACT

A combination illumination and reflector device 12 is disclosed having a reflective surface 11 and a plurality of flexible LED strips 13. Each of the flexible strips 13 are electrically connected to an LED controller 14. Power is provided by battery 15 or alternate power source 18. The LED controller 14 generally provides an on off switch to the LEDs 32 of the flexible strips 13. However controller 14 may also be connected, either by hard wire or over-the-air signal, to a smart device 17 running a light control application 16. A resilient frame, such as a flexible spring steel, is sewn into a fabric sleeve/edge seam about the perimeter 21 of the reflective surface 11 which provides a stand-alone structure when in an operative position.

20 Claims, 8 Drawing Sheets

(56) References Cited

U.S. PATENT DOCUMENTS

2019/0204716 A1\* 7/2019 Shirilla .................. G03B 15/06

OTHER PUBLICATIONS

"Bluetooth LED Controller—Single Color LED Dimmer", amazon. com. Retrieved from the Internet: <URL: https://www.superbrightleds. com/moreinfo/single-color-dimmer-switches/bluetooth-led-controller-single-color-led-dimmer-smartphone-compatible-6-amps/5590/12463/?utm_source=product_review_email&utm_medium=email&utm_campaign=product_review_email>, 4 pages. Retrieved on Nov. 18, 2019.

"Menik CB-66A 66W Flexible Round Film LED Photographic Light," amazon.com. Retrieved from the Internet: <URL: https://www.amazon.com/Flexible-Photographic-2750-6500K-Bi-Color-Honeycomb/dp/B07M5K762J/ref=sr_1_1?tag=tecbri-20&keywords=menik+CB-66&qid=1571694360&sr=8-1>, 1 page. Retrieved on Nov. 18, 2019.

"Single Color Mini LED Dimmer," amazon.com. Retrieved from the Internet: <URL: https://www.superbrightleds.com/moreinfo/single-color-dimmer-switches/single-color-mini-led-dimmer-w-lc2-connector-wireless-rf-remote-5-amps/3051/12561/?utm_source=product_review_email&utm_medium=email&utm_campaign=product_review_email>, 5 pages. Retrieved on Nov. 25, 2019.

Visual Departures, "Flexfill: The Original Collapsible Reflectors." visualdepartures.com. Retrieved from the Internet <URL: https://visualdepartures.com/flexfill-collapsible-reflectors/, 4 pages. Retrieved on Nov. 18, 2019.

\* cited by examiner

FLEXIBLE ILLUMINATION AND REFLECTOR METHOD AND APPARATUS

FIELD OF THE INVENTION

This invention relates generally to photography; and more particularly to a method and apparatus for providing illumination with a flexible, collapsible reflector to furnish necessary or desired light on photographic subjects in various settings.

BACKGROUND

There are many types and styles of known collapsible and/or flexible reflectors. The reflectors come in many sizes and shapes, and often may be used together with different reflective surfaces. For example, the different surfaces may be used to fill in, reflect, diffuse, absorb or soften light on a photographic subject. Each of these prior reflective devices, however, have a similar drawback in that they are passive reflectors.

There are also many types of lighting devices including lighting umbrellas, flashes, studio light heads, LED lighting lamps and video lights among others. However, each of these devices have a drawback related to being bulky, require time consuming setup, and/or are constructed for studio use—thereby lacking the advantage of portability, versatility and convenience.

Therefore, there is a need in the art for a method and apparatus for providing a portable light source capable of providing illumination in a flexible, convenient package to furnish necessary and/or desirable lighting on a photographic subject in various settings. The present invention addresses these needs in the art.

SUMMARY

A preferred embodiment of a method and apparatus constructed in accordance with the principles of the present invention provides a device that is portable and lightweight, and which is capable of illuminating subjects in a variety of photographic applications and environments. The device may include various diffusers and/or gels to adjust the color temperature of the illumination. In addition, the device may include a variety of light control features and options through use of an optional application that controls light emitting diodes (LEDs) via an LED controller. To increase portability and flexibility, the device may be powered by a battery pack or may be plugged into a wall outlet.

The device has a self-supporting, circular shape that maximizes the light reflecting area for its size. Thereby including a large surface and high light output from a compact size.

One advantage of the device is that the device has a built-in resilient frame that enables easy folding and unfolding of the device while in the studio or other photographic setting. This eliminates cumbersome structures associated with prior art devices—which often required construction of a frame to support the lights or were otherwise flimsy. In some embodiments, the circular reflector can be folded into a small circular pouch by grasping the reflector frame on opposite sides of the reflector and twisting the frame in opposite directions. As the hands are then drawn back together, the reflector is easily folded into a small size—e.g., a fraction of the unfolded size—which may then be stored in a carry case.

Another advantage of the device is due to the use of LEDs carried on a flexible strip having an adhesive backing. Use of flexible LED strips do not inhibit the folding of the reflector into the small size.

An optional feature of the device is use of an app (or application program), which may be operated on a smart device to control LED functions. More specifically, various functions may be performed—such as turning the LEDs on and off, dimming the LEDs, adjusting the color of the LEDs, setting a maximum "on" time of the LEDs, creating a strobe of the LEDs, and fading the LEDs up or down (and adjusting the speed at which the fade occurs), among others.

Therefore, according to one aspect of the invention, there is provided a flexible photographic illumination device, comprising: a circular reflective surface having a perimeter; a resilient frame attached to the reflective surface at the perimeter, wherein the resilient frame supports the reflective surface when in an operative position; and a plurality of light emitting diodes (LEDs) mounted on a flexible strip and operatively connected to the circular reflective surface within the perimeter.

Further in accordance with some embodiments, the aspect of the invention described in the previous paragraph may further include: at least three flexible strips of LEDs mounted to the circular reflective surface and where the flexible strips are arranged generally parallel to one another; an LED controller connected to the LEDs; a program provided that is operative with the LED controller for controlling at least one of the following functions: turning the LEDs on and off, dimming the LEDs, adjusting the color of the LEDs, setting a maximum on time of the LEDs, creating a strobe of the LEDs, and fading the LEDs up or down (and adjusting the speed at which the fade occurs); and/or the flexible strips include a front side and a back side, the LEDs are mounted on the front side, and the back side includes an adhesive, whereby the flexible strips are mounted on the reflective surface with the adhesive.

According to another aspect of the invention, there is provided a flexible combination photographic reflector and light source device, comprising: a circular reflective surface having a perimeter; a resilient frame attached to the reflective surface at the perimeter; a plurality of flexible strips mounted with an adhesive on the circular reflective surface within the perimeter, each flexible strip including a plurality of light emitting diodes (LEDs) mounted thereon; and an LED controller operatively connected to the plurality of LEDs on the flexible strips.

According to yet another aspect of the invention, there is provided a method for forming a combination illumination and reflector device, comprising: forming a circular reflective surface having a perimeter; attaching a flexible spring steel frame to the reflective surface at the perimeter; mounting a plurality of flexible strips onto the circular reflective surface within the perimeter, each flexible strip including a plurality of light emitting diodes (LEDs) mounted thereon; and controlling the LED lights with an LED controller electrically connected to the plurality of LEDs on the flexible strips.

While the invention will be described with respect to preferred embodiment configurations and with respect to particular components and structures, it will be understood that the invention is not to be construed as limited in any manner by either such components and structures described herein. Instead, the principles of this invention extend to any method and apparatus in accordance with the claims.

These and other variations of the invention will become apparent to those skilled in the art upon a more detailed description of the invention. The advantages and features which characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

BRIEF DESCRIPTION OF THE DRAWINGS

Referring to the drawings, wherein like numerals represent like parts throughout the several views.

DETAILED DESCRIPTION

The principles of the present invention apply particularly well to its application as a combination flexible reflector and light source for photographic purposes. However, devices constructed in accordance with the principles of the present invention might be used in other environments in which a portable, lightweight and versatile light source might be desired.

Figure 1:
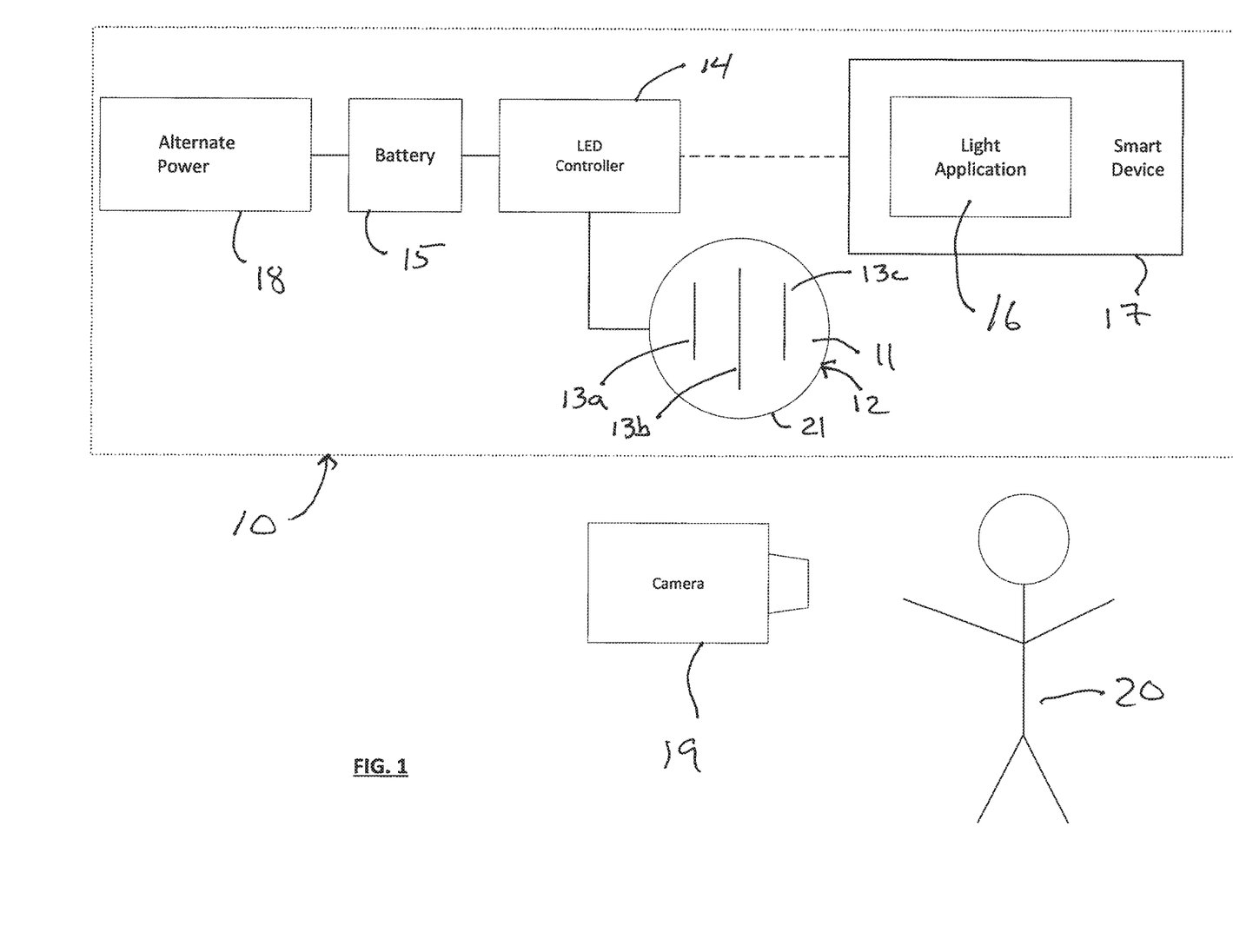
FIG. 1 is a schematic functional block diagram of several elements which may be included in some embodiments of the flexible illumination and reflector device in accordance with the principles of the present invention.

Turning now to FIG. 1, an example of a device constructed in accordance with the principles of the present invention is shown generally at the designation 10. The combination illumination and reflector device 12 includes a reflective surface 11 and a plurality of flexible LED strips 13a, 13b, and 13c (The flexible strips will be collectively referred to herein for convenience by the designation 13 unless a specific strip is being referred to or described). Each of the flexible strips 13 are electrically connected to an LED controller 14. Power is provided by battery 15, although an alternate power source 18 (e.g., an AC wall outlet) may also be utilized depending on the location in which the device 10 is employed.

The LED controller 14 generally provides an on off switch to the LEDs of the flexible strips 13. However controller 14 may also be connected, either by hard wire or over-the-air signal, to a smart device 17 running a light control application 16 (the control application may also be referred to herein as an "app"). In this fashion additional functions and control over the LEDs are provided, thereby increasing the utility of the device.

Generally in operation, a photographer operates camera 19 to take photographs of an object or person 20. Often due to ambient lighting conditions, either additional light or fill light is required to properly capture the image required or desired by the photographer. The device 10 is useful in these situations as it is a lightweight, portable accessory that may be packed by a photographer moving or traveling to a variety of locations and/or between angles relative to the object 20. In addition, the device 10 may be hand-held or mounted on standard light stands or tripods (not shown).

Still referring to FIG. 1, the combination illumination and reflector device 12 may be formed of a reflective material having a perimeter 21. A resilient frame, such as a flexible spring steel, is sewn into a fabric sleeve/edge seam about the perimeter. A variety of diffusers and gels may be arranged and configured to be placed over the reflective surface 11. In some embodiments the shape of the device is circular. However, other self-supporting shapes using a resilient frame—such as ovals—might be used. One commercially available device is a "Flexfill Five in One Reflector" manufactured by Visual Departures Ltd. of Ashley Falls, Mass.

Figure 3:
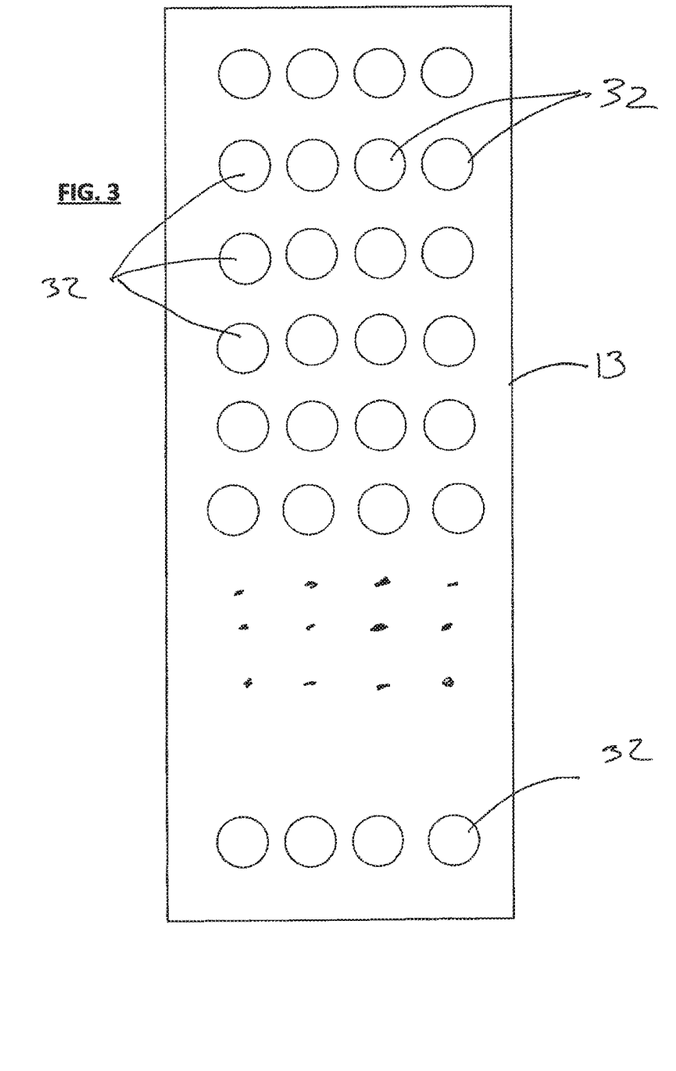
FIG. 3 is an illustration of a grouping of LED's mounted on a flexible strip.
Figure 4:
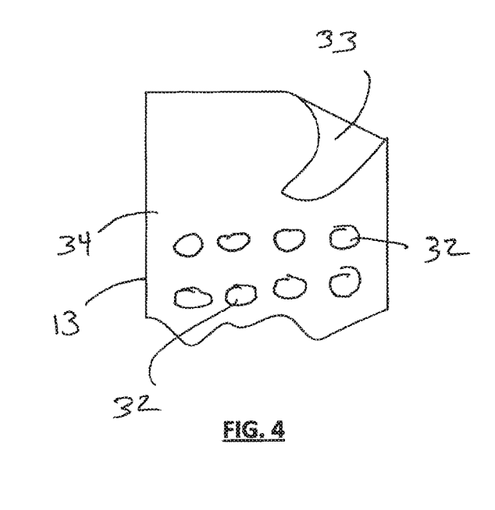
FIG. 4 is an illustration of the strip of FIG. 3 with a portion of a corner turned over to illustrate the adhesive on the back of the strip.

Next referring to FIG. 3 and FIG. 4, a schematic illustration of the flexible LED strips 13 is shown. More specifically, FIG. 3 illustrates the plurality of LEDs 32 mounted on the strip 13. In the illustrated embodiment there are four columns of LEDs running along the longitudinal length of the strip 13. However, other arrangements and number of columns of LEDs might be used. In an embodiment, the LEDs are 24 volt lights having a 5600k-5700k daylight balance and a high color rendering index value (i.e., approximately 95). LED strips 13 fitting these parameters are available commercially, for example, from SuperBrightLEDs.com located at 4400 Earth City Expressway, St. Louis, Mo. 63045 under model designation 4NFLS-CWH24-24V-CL.

An adhesive is located on the backside 33 of the strip 13, while the LEDs 32 are mounted on the front side 34. The adhesive cooperatively engages the reflector surface 11 to hold the flexible strips 13 in place. In one preferred embodiment, there are a plurality of flexible strips 13 mounted on the reflective surface 11. For example three strips 13 may be mounted generally parallel to one another (see FIG. 1). However, the number of strips 13 and the arrangement relative to one another may vary. For example, in the case of three strips 13, the strips may also be arranged as a triangle.

Returning to FIG. 1, battery 15 is preferably sized and configured to provide a working time period of illumination. For example four-eight hours of working time may be suitable. However, those of skill in the art will appreciate that use of a second battery, power brick, or charger may also be used to provide the necessary or desired working time for the battery. In an embodiment, a 24 volt, rechargeable lithium-ion battery is used. For convenience, a hook and loop fabric may be applied to the back of the battery and to a carrying case for the device to secure the battery 15 for storage or while traveling (best seen in FIG. 5b).

In addition, in some settings, alternate power 18 might be used in conjunction with or in lieu of battery 15. For example, a 120 volt AC wall outlet may be used together with a 24 volt charger or transformer.

LED controller 14 may be a simple switch or may be a BLE mesh device. Generally an LED controller operates to adjust exact brightness, lighting effects and color levels desired from LED lighting. One commercially available LED controller is the Single Color Mini LED Dimmer w/LC2 Connector (wireless RF Remote) model number MCBRF-5ALC2-PT available at SuperBrightLEDs.com.

This model is able to control on/off, brightness, and brightness shortcuts and includes a remote handheld device that communicates with a Bluetooth enabled pigtail cord 43 (best seen in FIG. 5d) that connects to battery 15 via connector lead 42 and LED strips 13 via connector lead 44. A commercially available Bluetooth Mesh pigtail cord is sold by SuperBrightLEDs.com under model number LF-BL-M1.

Figure 2:
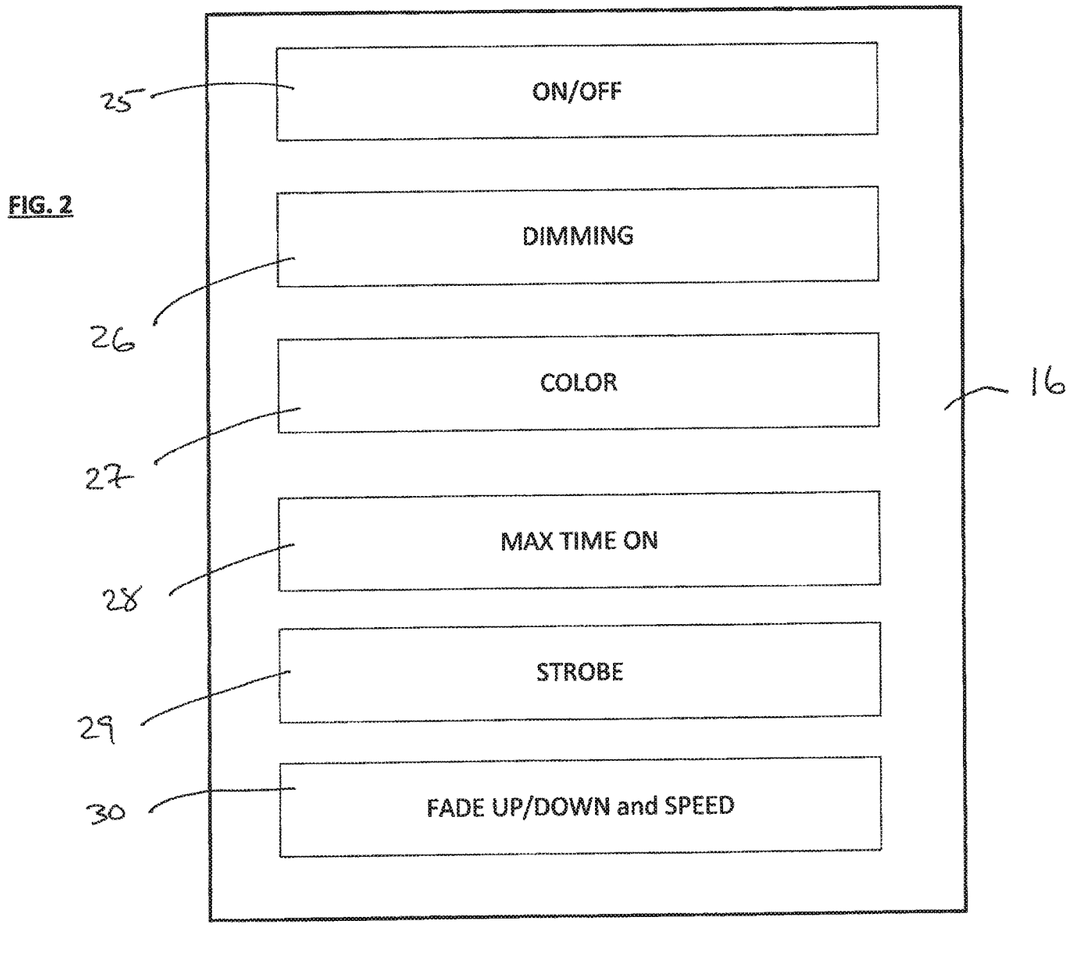
FIG. 2 is an illustrative menu of an app which may be used to provide additional control of the LEDs of the flexible illumination and reflector device of FIG. 1.

A Bluetooth enabled the LED controller 14 can also operate together with an application 16 running on a smart device, such as a smart phone (e.g., an Android or Apple iPhone). Referring to FIG. 2, a sample menu for a light application 16 running on a smart device 17 is illustrated. The various functions which may be controlled from the app 16 include:

Turning the LEDs 32 on and off at block 25. This option provides power to the flexible LED strips 13;

Dimming the LEDs at block 26. Many LEDs are dimmable upon reducing the power between the maximum voltage and a lower, minimum voltage;

Adjusting the color of the LEDs 32 at block 27. In this case, LEDs of different color are used (e.g., red, green and blue) and the controller adjusts the voltages between the respective color LEDs to achieve the desired color;

Setting a maximum on time of the LEDs 32 at block 28. This setting uses a timer function to control desired on/off working times of the LEDs;

Creating a strobe of the LEDs 32 at block 29. This creates a flash of the LEDs at one or more specific durations and intervals.

Fading the LEDs 32 up or down, and including adjusting the speed at which the fade occurs, at block 30. This setting provides a dimming or brightening of the LEDs 32 from a first to a second setting, and including the interval or speed at which the change occurs.

One such commercially available application which is able to perform several of these settings is the Open Lit app available at Google Play. The app runs on Android mobile devices and is Bluetooth Mesh compatible. The app can control dimmer and color temperature of different lighting devices. The main functions include dimming, color changing and timing.

Figure 5A:
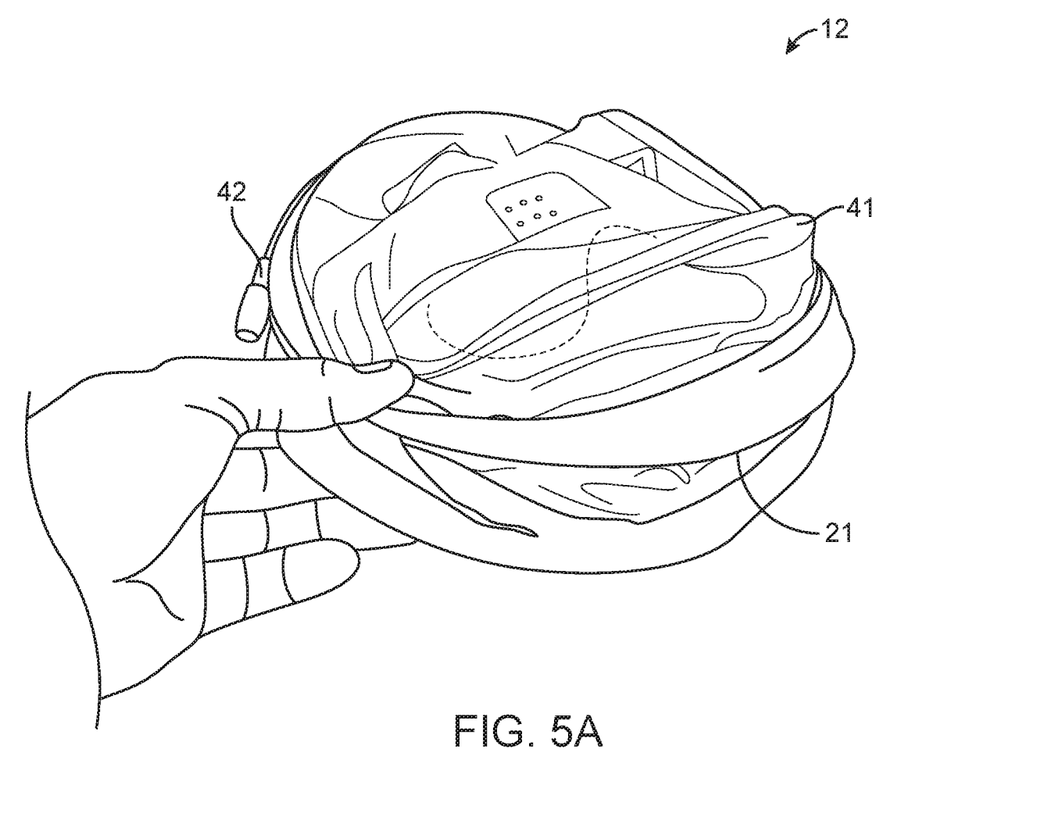
FIG. 5a is an illustration of the flexible illumination and reflector device folded.
Figure 5B:
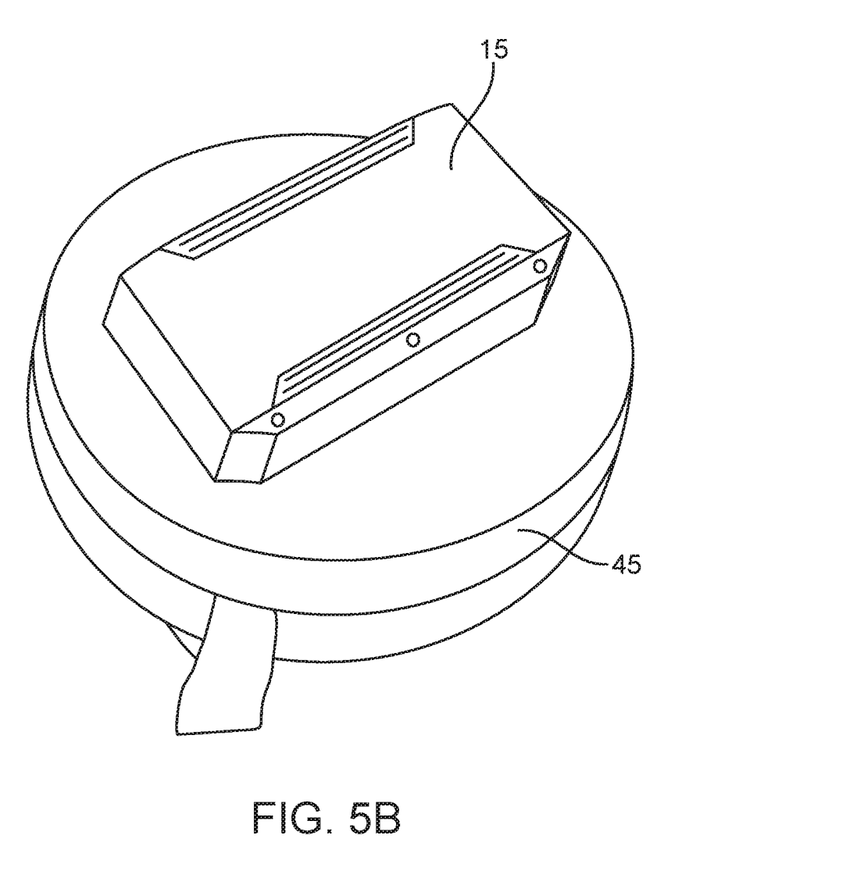
FIG. 5b is an illustration of the flexible illumination and reflector device inserted into a carrying case.

Turning now to FIG. 5a, FIG. 5b, FIG. 5c, and FIG. 5d the flexible combined illumination and reflector device 12 is first shown in FIG. 5a in a folded position. While not explicitly described herein, a protective cover surface of cloth, vinyl, flexible plastic or other material may be attached to the backside of the reflective surface 11. It will be appreciated by those of skill in the art that while in this position, both the reflective surface 11 and resilient frame member 21 are folded into a compact size that is a fraction of the open or operative position. Also shown in FIG. 5a is diffuser 41 which may be selectively placed over the LEDs 13 and reflective surface 11. FIG. 5b illustrates the carrying case 45 into which the folded illumination and reflector device 12 may be inserted. In some embodiments, the carrying case 45 includes a hook and loop fastener system to mount battery 15 onto the case 45 for convenience.

Figure 5C:
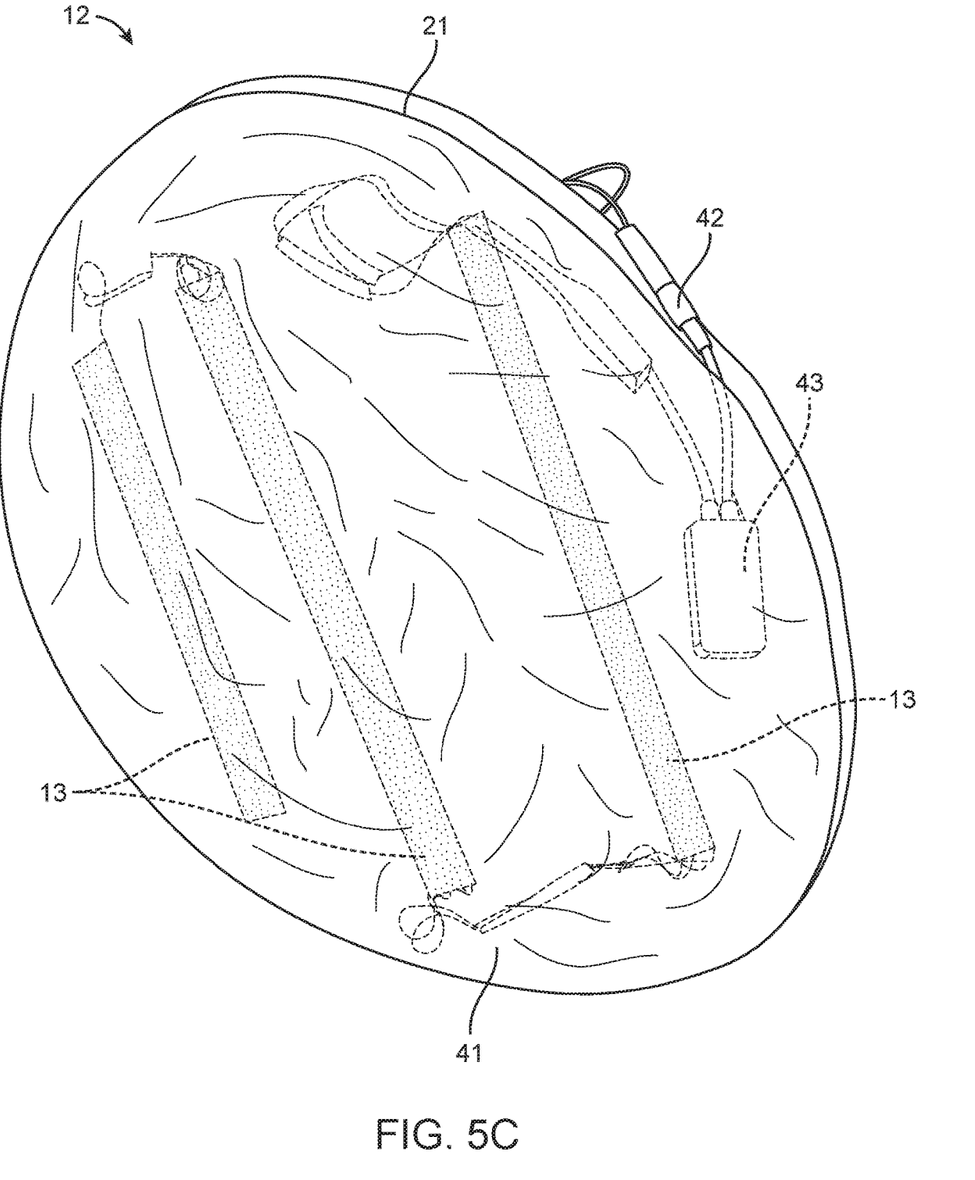
FIG. 5c is an illustration of the flexible illumination and reflector device opened with a light diffuser.
Figure 5D:
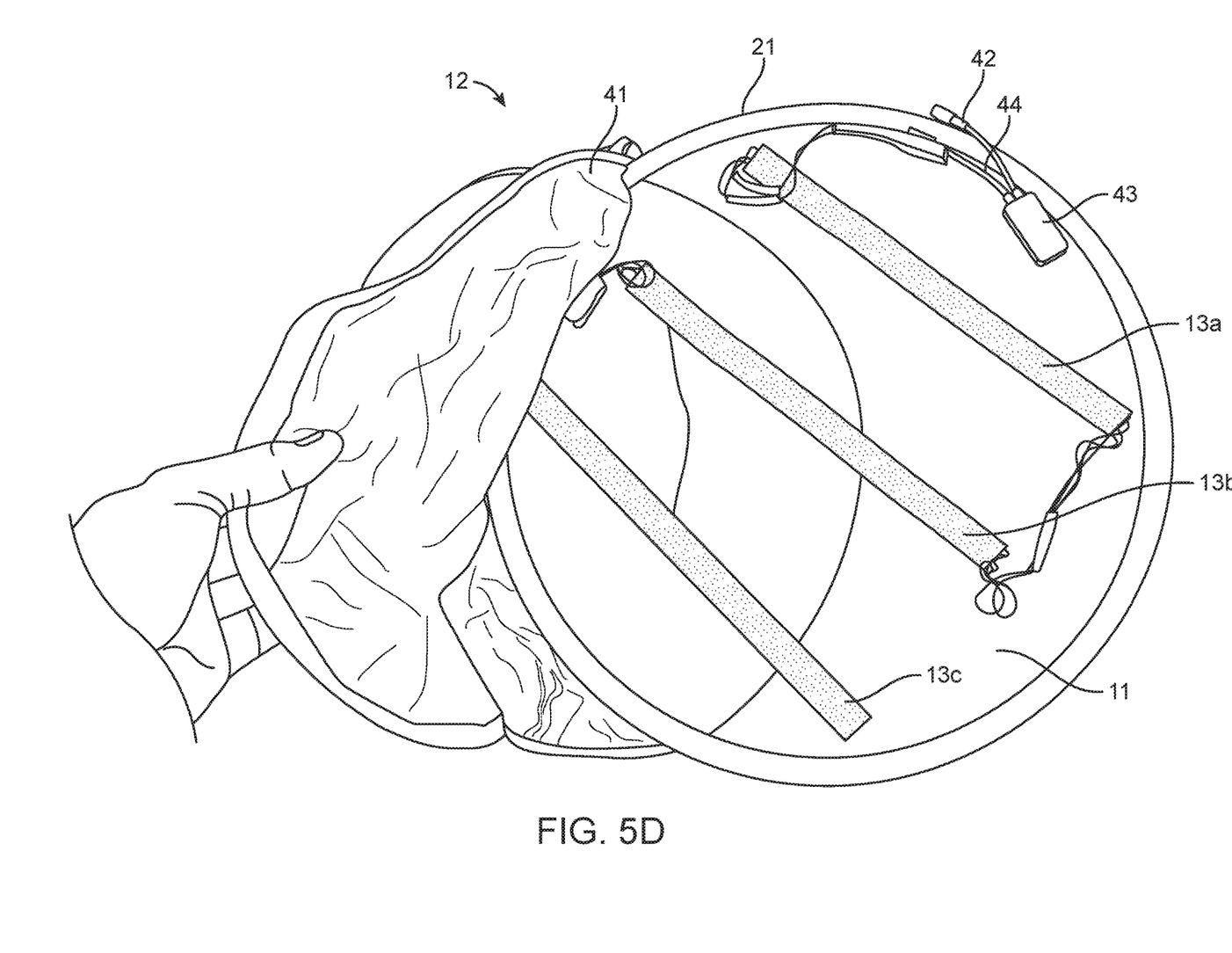
FIG. 5d is an illustration of the flexible illumination and reflector device opened with the light diffuser partially removed to show placement of the LED light strips.

The operative position for the illumination and reflector device 12 may be seen in FIG. 5c and FIG. 5d. FIG. 5c illustrates the diffuser 41 attached at the perimeter 21. Shown in phantom under the diffuser 41 are LED strips 13 and Bluetooth mesh device 43. Next at FIG. 5d, the diffuser 41 is partially removed to better illustrate the reflective surface 11, flexible LED strips 13, and Bluetooth mesh pigtail connector 43.

Figure 6:
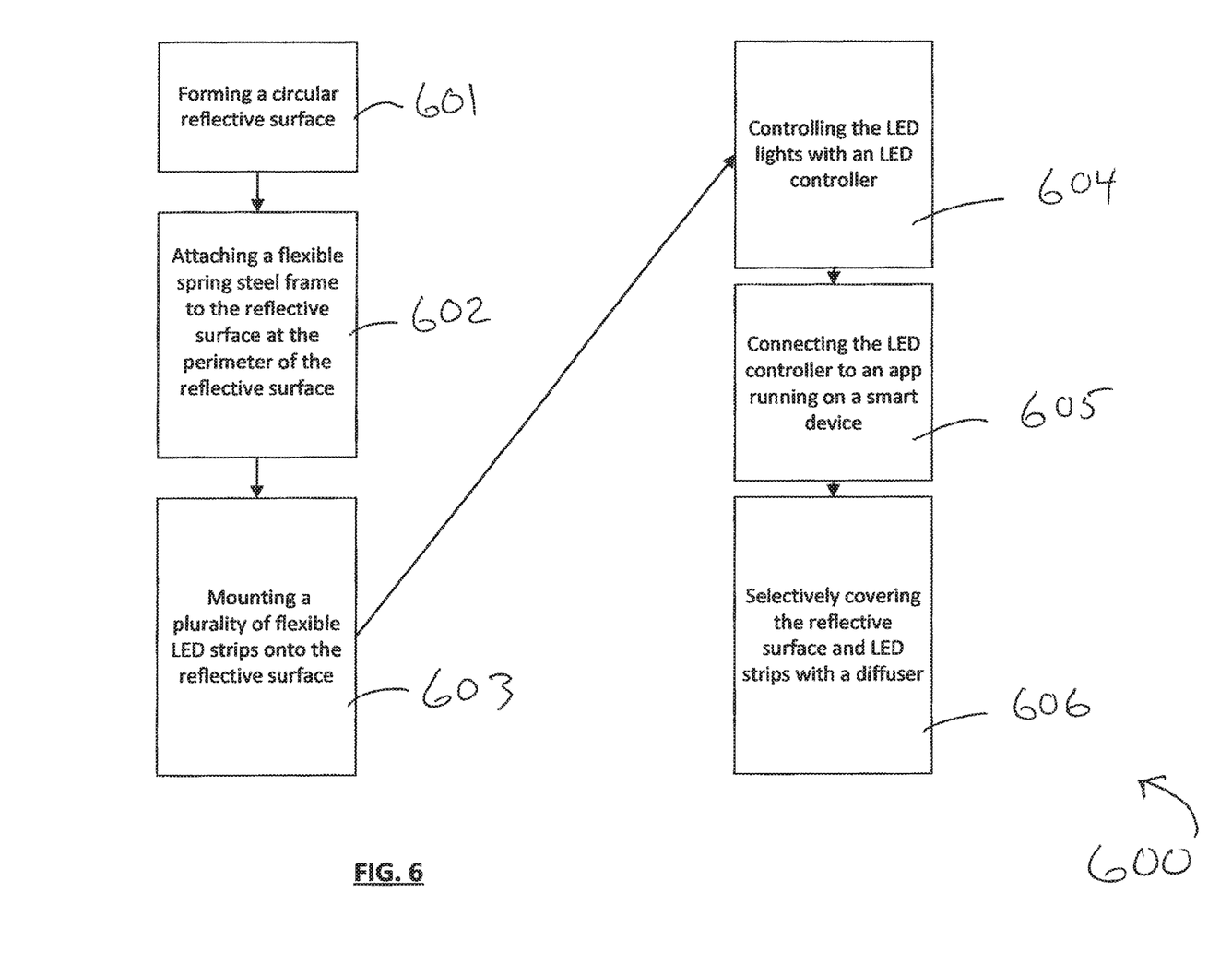
FIG. 6 is a flow chart of the steps taken to form the flexible illumination and reflector device.

Turning now to FIG. 6, a method for forming a combination illumination and reflector device is illustrated generally at 600. First at block 601, a circular reflective surface 11 having a perimeter 21 is formed. Next at block 602 a flexible spring steel frame is attached to the reflective surface at the perimeter in a sleeve or seam. At block 603 at least one LED strip 13, having a plurality of LED lights 32, is attached to the reflective surface 11 within the perimeter. Preferably the LED strip 13 is secured with an adhesive on the back 33 of the LED strip 13. However, other mounting methods such as sewing, straps, and pockets among others might be used. If more than one strip 13 is used, the LED strips 13 may be oriented in a number or arrangements including with the LED strips' longitudinal axes generally parallel with one another. Each flexible strip includes a plurality of light emitting diodes 32 (LEDs) mounted thereon.

At block 604 an LED controller 14 is electrically connected to the plurality of LEDs 32 on the flexible strips 13. At block 605 the LED controller 14 may be optionally connected to a light control app 16 running on a smart device 17 to provide additional light control functions. Finally, at block 606, the reflective surface 11 and LED lights 32 may be selectively covered with a diffuser depending on the ambient light and/or desire of the photographer.

In view of the foregoing, it will be appreciated that the principles of this invention apply to a method and apparatus for assisting with lighting in photographic settings. While particular embodiments of the invention have been described with respect to its application, it will be understood by those skilled in the art that the invention is not limited by such application or embodiment or the particular components disclosed and described herein.

Accordingly, other components that embody the principles of this invention can be configured within the spirit and intent of this invention. The arrangement described herein is provided as only one example of an embodiment that incorporates and practices the principles of this invention. Other modifications and alterations are well within the knowledge of those skilled in the art and are to be included within the broad scope of the appended claims.

What is claimed is:

1. A flexible photographic illumination device, comprising:
   a) a circular reflective surface having a perimeter;
   b) a resilient frame attached to the reflective surface at the perimeter, wherein the resilient frame supports the reflective surface when in an operative position;
   c) a plurality of light emitting diodes (LEDs) mounted on a flexible strip and operatively connected to the circular reflective surface within the perimeter; and
   d) an LED controller connected to the plurality of LEDs.

2. The flexible photographic illumination device of claim 1, further comprising at least three flexible strips of LEDS mounted to the circular reflective surface, wherein the flexible strips arranged generally parallel to one another.

3. The flexible photographic illumination device of claim 1, further comprising a power source connected to the LEDs.

4. The flexible photographic illumination device of claim 3, wherein the power source is a battery.

5. The flexible photographic illumination device of claim 1 further comprising a program operative with the LED controller for controlling at least one selected from the list: turning the LEDs on and off, dimming the LEDs, adjusting the color of the LEDs, setting a maximum on time of the LEDs, creating a strobe of the LEDs, and fading the LEDs up or down (and adjusting the speed at which the fade occurs).

6. The flexible photographic illumination device of claim 5 wherein the program operates on a smart device and is connected to the LED controller over the air.

7. The flexible photographic illumination device of claim 6, wherein the over the air program is Bluetooth.

8. The flexible photographic illumination device of claim 1, wherein the flexible strips include a front side and a back side, the LEDs are mounted on the front side, and the back side includes an adhesive, whereby the flexible strips are mounted on the reflective surface with the adhesive.

9. A flexible combination photographic reflector and light source device, comprising:
   a) a circular reflective surface having a perimeter;
   b) a flexible spring steel frame attached to the reflective surface at the perimeter;
   c) a plurality of flexible strips mounted with an adhesive on the circular reflective surface within the perimeter, each flexible strip including a plurality of light emitting diodes (LEDs) mounted thereon; and
   d) an LED controller operatively connected to the plurality of LEDs on the flexible strips.

10. The flexible combination device of claim 9, further comprising at least three flexible strips of LEDS mounted to the reflective surface, the flexible strips arranged generally parallel to one another.

11. The flexible combination device of claim 10, further comprising a power source connected to the LED controller.

12. The flexible combination device of claim 11, wherein the power source is a battery.

13. The flexible combination device of claim 9, further comprising a program operative with the LED controller for controlling at least one of the following functions: turning the LEDs on and off, dimming the LEDs, adjusting the color of the LEDs, setting a maximum on time of the LEDs, creating a strobe of the LEDs, and fading the LEDs up or down and adjusting the speed at which the fade occurs.

14. The flexible combination device of claim 13, wherein the program operates on a smart device and is connected to the LED controller over the air.

15. The flexible combination device of claim 14, wherein the over the air program is Bluetooth.

16. A method of forming a combination illumination and reflector device, comprising:
   a) forming a circular reflective surface having a perimeter;
   b) attaching a flexible spring steel frame to the reflective surface at the perimeter;
   c) mounting a plurality of flexible strips onto the circular reflective surface within the perimeter, each flexible strip including a plurality of light emitting diodes (LEDs) mounted thereon; and
   d) controlling the LED lights with an LED controller electrically connected to the plurality of LEDs on the flexible strips.

17. The method of claim 16, further comprising electrically connecting the LED controller to a battery.

18. The method of claim 16, further comprising connecting the LED controller to an application running on a smart device for selectively controlling power to the LED lights and to change the color temperature.

19. The method of claim 16, further comprising selectively covering the reflective surface and LED lights with a diffuser.

20. The flexible photographic illumination device of claim 1, wherein the LED controller is a BLE mesh device.

\* \* \* \* \*